United States Patent [19]

Satoh et al.

[11] Patent Number: 5,572,508
[45] Date of Patent: Nov. 5, 1996

[54] OPTICAL DISC HAVING SQUARE INFORMATION PITS ARRANGED IN SYMMETRICAL PATTERNS

[75] Inventors: Makoto Satoh; Hiroyuki Nakajima, both of Tokorozawa, Japan

[73] Assignee: Pioneer Electronic Corporation, Tokyo, Japan

[21] Appl. No.: 529,788

[22] Filed: Sep. 18, 1995

Related U.S. Application Data

[63] Continuation of Ser. No. 236,042, May 2, 1994, abandoned.

[30] Foreign Application Priority Data

May 6, 1993 [JP] Japan ..................... 5-105711

[51] Int. Cl.⁶ ........................................ G11B 7/24
[52] U.S. Cl. ............... 369/275.4; 369/109; 369/275.1
[58] Field of Search ..................... 369/32, 47, 48, 369/272, 273, 275.1, 275.3, 275.4, 276, 124, 54, 58, 100, 109

[56] References Cited

U.S. PATENT DOCUMENTS

| | | | |
|---|---|---|---|
| 4,896,313 | 1/1940 | Hirose et al. | 369/275.4 |
| 4,956,214 | 9/1990 | Imataki et al. | 369/275.1 |
| 5,200,941 | 4/1993 | Matoba et al. | 369/275.4 |
| 5,249,175 | 9/1993 | Akahira et al. | 369/275.1 |
| 5,260,930 | 11/1993 | Maeda | 369/275.3 |
| 5,331,623 | 7/1994 | Matoba et al. | 369/275.3 |
| 5,331,626 | 7/1994 | Sugiura | 369/275.1 |
| 5,359,591 | 10/1994 | Nomoto | 369/275.3 |

FOREIGN PATENT DOCUMENTS

| | | |
|---|---|---|
| 0 376 673 | 7/1990 | European Pat. Off. . |
| 0376626 | 7/1990 | European Pat. Off. . |
| 0 502 582 | 9/1992 | European Pat. Off. . |
| 0 551 753 | 7/1993 | European Pat. Off. . |
| 0 553 573 | 8/1993 | European Pat. Off. . |
| 0 553 548 | 8/1993 | European Pat. Off. . |

*Primary Examiner*—Tan Dinh
*Attorney, Agent, or Firm*—Young & Thompson

[57] ABSTRACT

An optical disc is provided with a plurality of information units arranged in the circumferential direction on the track, each of which has a square shape, and has a predetermined unit length in the circumferential direction and a predetermined unit length in the radial direction. A plurality of surface deformed portions are formed each in one of the information units respectively and comprises a plurality of surface deformed pieces having substantially the same size. The surface deformed portions have at least M kinds of forms, which are different in directions of M kinds from each other by combinations of the surface deformed pieces. Each of the surface deformed portions has a plane figure form substantially symmetrical with respect to a straight line passing through a center point of the information unit, and each of the surface deformed portions having a predetermined optical height or depth.

6 Claims, 11 Drawing Sheets

| | I | II | III | IV |
|---|---|---|---|---|
| READING BEAM LS AND PIT P | ⊘ | ⊘ | ⊘ | ⊘ |
| PIT DIRECTION D | → | ↑ | ← | ↓ |

| | i | ii | iii |
|---|---|---|---|
| READING BEAM LS AND PIT P | ⊘ | ⊘ | ⊘ |
| PIT DIRECTION D | → | → | → |
| REFLECTED LIGHT QUANTITY | LARGE | MIDDLE | SMALL |
| PIT SIZE | SMALL | MIDDLE | LARGE |

FIG. 7

| | d1 | d2 | d3 | d4 | d5 | d6 | d7 | d8 | SUM | SUB1 | SUB2 | SUB3 | SUB4 |
|---|---|---|---|---|---|---|---|---|---|---|---|---|---|
| A1 | 0.102 | 0.112 | 0.111 | 0.096 | 0.079 | 0.073 | 0.076 | 0.086 | 0.735 | 0.107 | 0.061 | -0.017 | -0.087 |
| A2 | 0.113 | 0.101 | 0.084 | 0.071 | 0.069 | 0.083 | 0.102 | 0.113 | 0.736 | 0.002 | -0.086 | -0.122 | -0.086 |
| A3 | 0.086 | 0.075 | 0.074 | 0.081 | 0.094 | 0.109 | 0.113 | 0.102 | 0.734 | -0.102 | -0.086 | -0.018 | 0.060 |
| A4 | 0.076 | 0.085 | 0.100 | 0.107 | 0.105 | 0.098 | 0.086 | 0.076 | 0.733 | 0.003 | 0.061 | 0.087 | 0.059 |
| A5 | 0.088 | 0.101 | 0.111 | 0.107 | 0.094 | 0.084 | 0.077 | 0.077 | 0.739 | 0.075 | 0.087 | 0.053 | -0.015 |
| A6 | 0.113 | 0.112 | 0.100 | 0.082 | 0.070 | 0.073 | 0.088 | 0.102 | 0.740 | 0.074 | -0.012 | -0.090 | -0.114 |
| A7 | 0.102 | 0.087 | 0.075 | 0.071 | 0.080 | 0.098 | 0.113 | 0.113 | 0.739 | -0.069 | -0.113 | -0.091 | -0.015 |
| A8 | 0.077 | 0.076 | 0.086 | 0.096 | 0.105 | 0.109 | 0.102 | 0.085 | 0.736 | -0.066 | -0.010 | 0.056 | 0.088 |
| B1 | 0.111 | 0.122 | 0.122 | 0.105 | 0.087 | 0.083 | 0.087 | 0.095 | 0.812 | 0.108 | 0.060 | -0.018 | -0.088 |
| B2 | 0.123 | 0.110 | 0.094 | 0.081 | 0.079 | 0.092 | 0.112 | 0.123 | 0.814 | 0.002 | -0.086 | -0.122 | -0.086 |
| B3 | 0.095 | 0.086 | 0.086 | 0.090 | 0.103 | 0.120 | 0.124 | 0.111 | 0.815 | -0.101 | -0.085 | -0.017 | 0.059 |
| B4 | 0.086 | 0.095 | 0.110 | 0.117 | 0.115 | 0.108 | 0.096 | 0.086 | 0.813 | 0.003 | 0.061 | 0.087 | 0.059 |
| B5 | 0.095 | 0.108 | 0.121 | 0.116 | 0.101 | 0.092 | 0.087 | 0.086 | 0.806 | 0.074 | 0.086 | 0.054 | -0.014 |
| B6 | 0.122 | 0.121 | 0.108 | 0.089 | 0.078 | 0.083 | 0.096 | 0.109 | 0.806 | 0.074 | -0.014 | -0.090 | -0.114 |
| B7 | 0.109 | 0.094 | 0.085 | 0.081 | 0.087 | 0.106 | 0.123 | 0.122 | 0.807 | -0.069 | -0.113 | -0.089 | -0.013 |
| B8 | 0.086 | 0.085 | 0.094 | 0.103 | 0.114 | 0.119 | 0.110 | 0.095 | 0.806 | -0.070 | 0.014 | 0.054 | 0.086 |

☐ REPRESENTS THE MINIMUM VALUE OF |SUB1|~|SUB4|

OPTICAL DISC HAVING SQUARE INFORMATION PITS ARRANGED IN SYMMETRICAL PATTERNS

This application is a continuation of application Ser. No. 08/236,042, filed May 2, 1994, now abandoned.

BACKGROUND OF THE INVENTION

1. Field of the Invention

The present invention relates to an optical disc, an apparatus for reproducing information from the optical disc, and a method of recording information on and reproducing it from the optical disc.

2. Description of the Related Art

FIG. 9 shows a conventional apparatus for reading an optical disc

In FIG. 9, when music and image information is recorded on an optical disc 92, the information is converted into a signal, which parameter is a pit length of an information pit 91 on an information recording surface 95. When the optical disc 92 is read, the reproducing apparatus irradiates a laser light onto the information pit 91 to form a laser beam light spot LS having a predetermined diameter, detects the diffracted and reflected light by a light detector, which consists of a photodiode etc., and outputs it as an electric signal. Then, the reproducing apparatus extracts the recorded music and image information out of this electric signal by applying a signal conversion process contrary to the process at the time of recording, and outputs it. The compact disc (CD), the laser video disc (LVD) etc. are known as such an optical disc. In FIG. 9, a reference numeral 93 represents a substrate, which consists of polycarbonate resin etc., and a reference numeral 94 represents a protection layer.

As mentioned above, the signal is read out by use of the change in the reflected light quantity depending on the existence of the pit at the time of scanning the optical beam on the optical disc.

In such an optical disc, the information recording density is greatly influenced by the value of a track pitch $P_1$ i.e. the interval between adjacent turns of the track each of which is a center line of the pit array of the information pit 91 as shown in FIG. 10, and the value of the diameter of the beam spot LS of the laser light irradiated onto the information pit 91.

Therefore, it may be proposed to narrow or reduce the value of the track pitch from the above explained value of FIG. 10, in order to record more information on the optical disc.

However, although there arises no problem in case of the examples shown in FIG. 9 and FIG. 10, if the track pitch is reduced to be the value $P_2$ which is less than the value $P_1$ of FIG. 10 (for example, $P_2=P_1/2$) as shown in FIG. 11, for example, information pits 91B and 91C on the neighboring tracks other than the track of the information pit 91A to be read, are included within the range of the beam spot LS of the laser light. Therefore, without any countermeasure, the crosstalk quantity increases, and it cannot be practically used. Thus, in order to prevent the signal from the neighboring track from leaking thereinto (crosstalk), the track pitch should be made wide enough with respect to the diameter of the beam spot LS, resulting in the obstacle to high density recording of the optical disc.

On the other hand, it may be also proposed that the diameter of the beam spot LS of the laser light is further reduced. However, as shown in FIG. 12, if the laser light with a wavelength λ is condensed at the position of the focal length f by an objective lens OL, the minimum laser beam diameter w is expressed by a following expression (1).

$$W = 1.22 \times (\lambda/NA) \ldots \quad (1)$$

Here, NA represents a quantity called a numerical aperture of the objective lens OL. If n represents the refraction coefficient of the objective lens, and Θ represents the output angle of the light from the objective lens, the numerical aperture NA is expressed by a following expression (2).

$$NA = n \times \sin\Theta \ldots \quad (2)$$

Therefore, in order to reduce the minimum laser beam diameter W, the wavelength λ may be reduced or the numerical aperture NA may be increased.

In addition, as for the wavelength λ of the laser light, the wavelength λ of the semiconductor laser presently available for optical discs, is about λ=0.780 μm (μm (micrometer) is $10^{-6}$ m). Moreover, as for the value of the numerical aperture NA, it is about NA=0.45, in case of the CD. From this, the minimum laser beam diameter Wmin is approximately expressed by a following expression (3).

$$Wmin = 1.22 \times (0.780/0.45) = 2.1 \ \mu m \ldots \quad (3)$$

Therefore, when the laser beam spot is irradiated on a certain pit array, the minimum track pitch which does not cause the crosstalk becomes about 1.6 μm. This value is employed by many optical discs presently available.

On the other hand, there may be proposed a method of performing a high density record, in which two or more items of information are represented by one pit, and in which pattern recognition of one pit pattern itself is carried out. However, because of the pattern recognition of one pit pattern itself, this method should be poor to a positional offset of the pit pattern, and the constitution for pit-pattern detection should be complicated.

SUMMARY OF THE INVENTION

Therefore, it is an object of the present invention to provide an optical disc, an apparatus for reading the optical disc, and a method of recording and reading the optical disc, which enables high density recording by a simple construction even under the condition of the laser light wavelength and the numerical aperture of the objective lens, which are presently available.

The above object of the present invention can be achieved by an optical disc provided with: a substrate in a disc shape, having an information record surface to which information is recorded; a track spirally formed on the information record surface in a circumferential direction of the optical disc, and having a predetermined track pitch in a radial direction of the optical disc; a plurality of information units arranged in the circumferential direction on the track, each of which has a square shape, and has a predetermined unit length in the circumferential direction and a predetermined unit length in the radial direction; and a plurality of surface deformed portions, each of which is formed in one of the information units respectively and comprises a plurality of surface deformed pieces having substantially the same form to each other, the surface deformed portions having at least M kinds of forms (M≧2, M: natural number), which are different, in directions of M kinds on a plane of the information record surface, from each other by a combination of existences of the surface deformed pieces, each of the surface deformed portions having a plane figure form substantially symmetrical with respect to a straight line passing through a center point of the information unit as a symmetrical axis, each of the surface deformed portions having a predetermined optical height or depth.

In one aspect of the optical disc of the present invention, it is preferable that the surface deformed portions have M×N kinds of forms (N≧2, N: natural number), which are different, in directions of M kinds and sizes of N kinds on the plane of the information record surface, from each other by a combination of existences of the surface deformed pieces.

The above object of the present invention can be also achieved by an apparatus for reading the above described optical disc of the present invention. The reading apparatus is provided with: a light irradiating device for irradiating a laser light having a predetermined wavelength onto the information record surface under an optical condition of a predetermined numerical aperture; an optical detecting device having M×K divided light receiving surfaces (K: natural number) such that a line parallel to the disc circumferential direction corresponds to one of division lines, for converting light incident on the light receiving surfaces into electric signals to output light detection signals respectively; an optical system for directing the reflected laser light, which is diffracted and reflected by the surface deformed portions onto a center portion of the light receiving surfaces in case that the laser light is irradiated onto a center line of the track; and an operating device for obtaining an information signal corresponding to the form of the surface deformed portion on the basis of the light detection signals to output the information signal.

In one aspect of the reading apparatus of the present invention, it is preferable that the operating device includes a device for obtaining the symmetrical axis of the surface deformed portion on the basis of the light detection signals, and a device for obtaining the direction of the surface deformed portion on the basis of the light detection signals, the operating device obtaining the information signal on the basis of the obtained symmetrical axis and the obtained direction.

In another aspect of the reading apparatus of the present invention, it is preferable that the surface deformed portions have M×N kinds of forms (N≧2, N: natural number), which are different, in directions of M kinds and sizes of N kinds on the plane of the information record surface, from each other by a combination of existences of the surface deformed pieces, and that the operating device further includes a device for obtaining the size of the surface deformed portion on the basis of the light detection signals.

The above object of the present invention can be also achieved by a method of recording and reading an optical disc, provided with the steps of: preparing a substrate in a disc shape, having an information record surface to which information is to be recorded; forming a track spirally on the information record surface in a circumferential direction of the optical disc, the track having a predetermined track pitch in a radial direction of the optical disc; arranging a plurality of information units in the circumferential direction on the track, each of which has a square shape, and has a predetermined unit length in the circumferential direction and a predetermined unit length in the radial direction; converting and recording the information into a form of a surface deformed portion, by forming a plurality of surface deformed portions, each of which is formed in one of the information units respectively and comprises a plurality of surface deformed pieces having substantially the same form to each other, and by giving at least M kinds of forms to the surface deformed portions (M≧2, M: natural number), which are different, in directions of M kinds on a plane of the information record surface, from each other by a combination of existences of the surface deformed pieces, each of the surface deformed portions having a plane figure form substantially symmetrical with respect to a straight line passing through a center point of the information unit as a symmetrical axis, each of the surface deformed portions having a predetermined optical height or depth; irradiating a laser light having a predetermined wavelength onto the information record surface under an optical condition of a predetermined numerical aperture; directing the reflected laser light, which is diffracted and reflected by the surface deformed portions, onto a center portion of M×K divided light receiving surfaces (K: natural number) of an optical detecting device in which a line parallel to the disc circumferential direction corresponds to one of division lines, in case that the laser light is irradiated onto a center line of the track; converting light incident on the light receiving surfaces into electric signals to output light detection signals respectively, by the optical detecting device; and obtaining an information signal corresponding to the information converted into the form of the surface deformed portion on the basis of the light detection signals.

In one aspect of the recording and reading method of the present invention, it is preferable that, in the information signal obtaining step, the symmetrical axis of the surface deformed portion and the direction of the surface deformed portion are firstly obtained on the basis of the light detection signals, to obtain the information signal on the basis of the obtained symmetrical axis and the obtained direction.

In another aspect of the recording and reading method of the present invention, it is preferable that, in the information converting and recording step, M×N kinds of forms (N≧2, N: natural number) are given to the surface deformed portions, which are different, in directions of M kinds and sizes of N kinds on the plane of the information record surface, from each other by a combination of existences of the surface deformed pieces, and that, in the information signal obtaining step, the size of the surface deformed portion is obtained on the basis of the light detection signals.

In the optical disc, the reading apparatus, and the recording and reading method of the above described present invention, high density recording is performed by making two or more pieces of information be recorded by one surface deformed portion (for example, a pit).

Namely, various forms, which are distinguished to each other, are given to the pits as a method of recording information on the optical disc by a high density. For example, if 8 kinds of forms, which are distinguished to each other, are utilized, 8 kinds (3 bits) of information can be recorded in one pit, so that compared with the conventional method of detecting only the existence of a pit, a high density record can be realized.

In the present invention, each of the pit may be arranged in such a state that the center of the pit is shifted from a center of a reading laser light to a certain direction, which is defined as the direction of the pit.

For example, the pits have 4 kinds of directions, and are distinguished and detected as different pits respectively which directions differ from each other. Further, for example, the pits, which directions are the same to each other but which sizes are different from each other, are different from each other in the reflected light quantity, so that the pits can be further distinguished and detected as different pits by use of the reflected light quantity. In this case, if the directions of the pits are M kinds, and the sizes of the pits are N kinds, there exist M×N kinds of the distinguishable pits, so that M×N kinds of information can be held by one pit.

In this manner, for example, 16 kinds of the pits are formed from one pit. Namely, a pit consists of the combination of the existences of nine pit pieces, which forms are substantially the same to each other, so that 8 kinds of directions and 2 kinds of sizes are obtained. Therefore, 8×2=16 kinds of the pits can be obtained.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 is a table for showing detection signals $d_1$ to $d_8$, difference signals SUB1 to SUB4 and a whole light quantity SUM as for each of the pits of A1 to A8 and B1 to B8 types;

DETAILED DESCRIPTION OF THE PREFERRED EMBODIMENTS

Hereinbelow, preferable embodiments of the present invention will be explained on the basis of drawings.

Figure 1A:
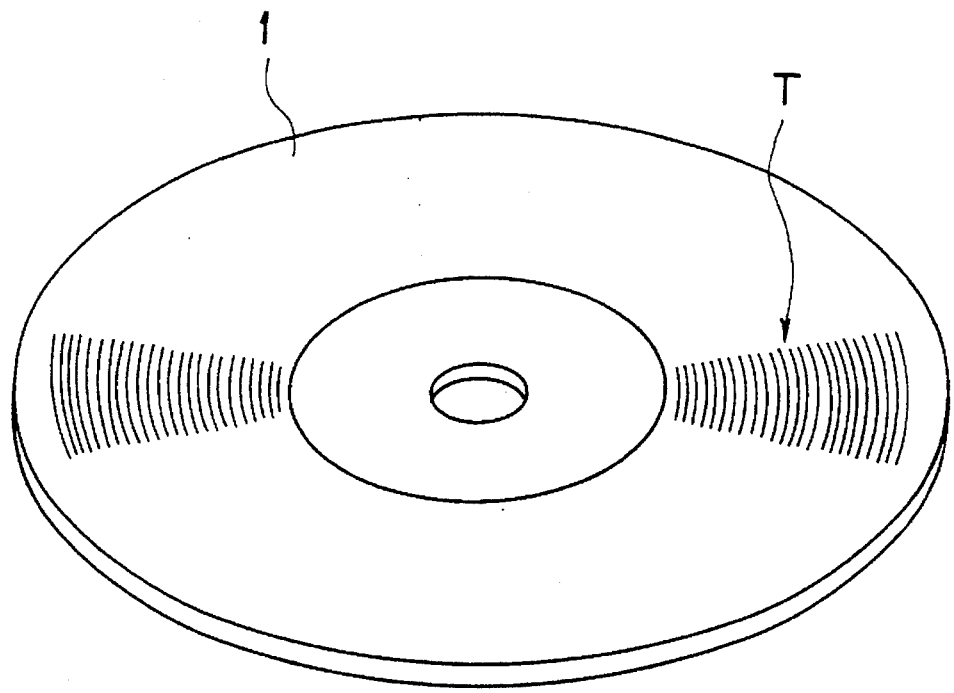
FIG. 1A is a perspective view of a compact disc.

FIG. 1A indicates an external appearance of a compact disc as an optical disc, for example. One track T is formed on a compact disc 1. The track T is in a spiral shape on the whole, which goes to the outer circumferential side from the inner circumferential side of the disc.

Figure 1B:
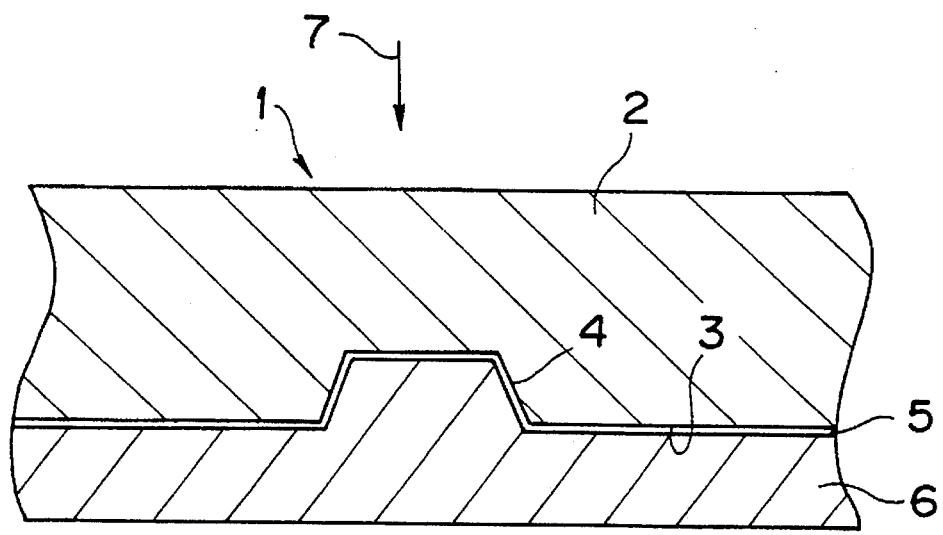
FIG. 1B is a cross-sectional view of the compact disc of FIG. 1A.

FIG. 1B indicates a cross section of the compact disc 1 of FIG. 1A. The compact disc 1 includes a transparent substrate 2, which consists of polycarbonate resin etc. An information pit 4 as a surface deformed portion is formed on one surface i.e. an information record surface 3 of the substrate 2. The surface of the substrate 2 on which the pit 4 is formed i.e. the information record surface 3, is covered with a metal vapor deposited film as a reflection film 5, such as aluminum, and further covered with a protection layer 6. In addition, an arrow 7 indicates the direction in which a reading beam is irradiated.

In the present embodiment, high density recording is performed by making two or more pieces of information be held by one pit 4. Hereinbelow, it will be explained in full detail, with referring to FIGS. 2A to 2C, and FIG. 3.

Figures 2A, 2B, 2C:
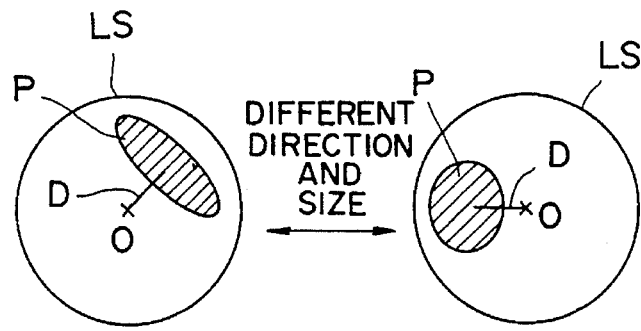
FIG. 2A is a diagram for explaining the relationship between a pit reading beam and a pit.
FIG. 2B is a diagram for indicating pits having 4 kinds of directions.
FIG. 2C is a diagram for indicating pits, which directions are the same to each other and which sizes are different from each other.

The relationship between the pit and the reading beam is shown in FIG. 2A, in which a pit P is arranged in such a state that the center thereof is shifted from a center O of a reading beam LS to a certain direction D. Here, the direction D is defined as the direction of the pit P. And, the pits having 4 kinds of directions are shown in FIG. 2B, in which each of the pits I to IV is distinguished and detected respectively as a pit whose direction D differs from each other. Moreover, as shown in FIG. 2C, since the pits i, ii and iii whose directions are the same but whose sizes are different from each other, are different from each other in the reflected light quantity, they can be distinguished and detected as different pits by use of the reflected light quantity as well as the direction of the pit.

Therefore, if the directions of the pits are M kinds, and the sizes of the pits are N kinds, there exist M×N kinds of the distinguishable pits, so that M×N kinds of information can be held by one pit.

Figure 3:
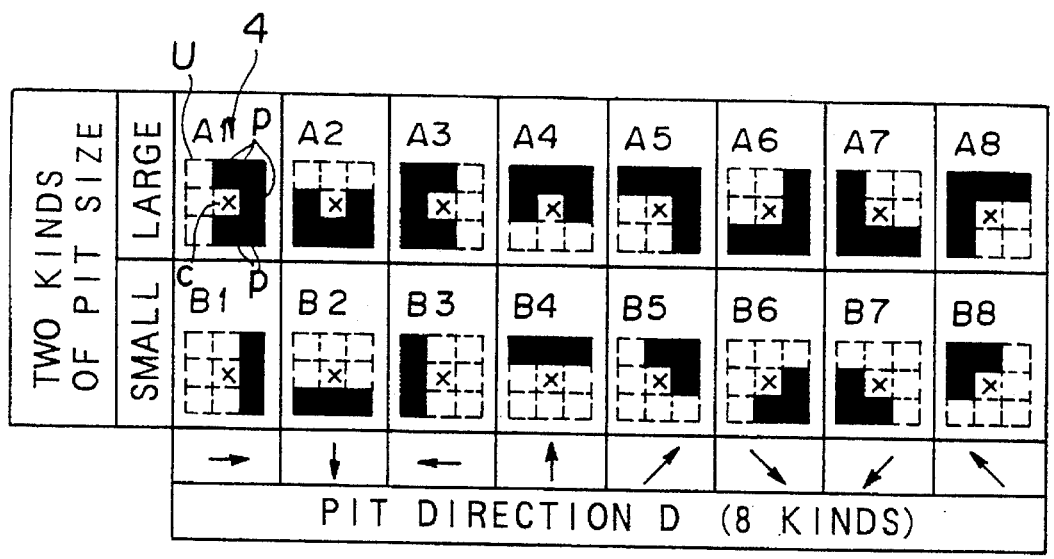
FIG. 3 is a diagram for indicating pits having 8 kinds of directions and two kinds of sizes.

In the present embodiment, as shown in FIG. 3, 16 kinds of the distinguishable pits are formed from one pit. Namely, in FIG. 3, a pit 4 consists of the combination of the existences of 9 pit pieces p, whose forms are substantially the same to each other, so that 8 kinds of directions and 2 kinds of sizes are obtained. Therefore, 8×2=16 kinds of the distinguishable pits (A1 to A8 and B1 to B8 types) can be obtained.

As shown in FIG. 3, for example, the pit of A1 type consists of 5 pieces of the pit pieces p shaded black in the figure, which direction is "→" and which size is "large". In FIG. 3, the whole area around each pit enclosed by the dotted line is defined as an information unit U, and a position C of a x mark is defined as a center point of the information unit.

When the center of the reading beam is coincident with the center point C of the information unit U, the information pit 4 of the above mentioned FIG. 3 is detected. Hereinbelow, a method of detecting the pit will be explained.

Figure 4A:
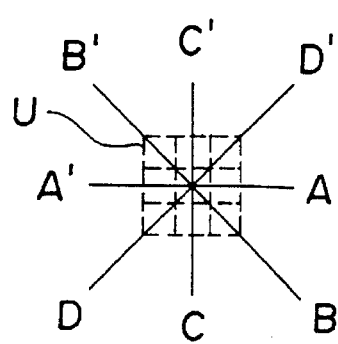
FIG. 4A is a diagram for indicating an information unit.
Figure 4B:
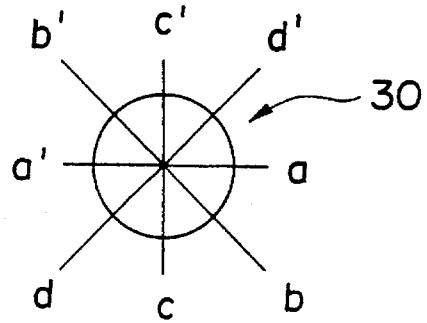
FIG. 4B is a diagram for indicating a detector for optically detecting the information unit of FIG. 4A.

FIG. 4A and FIG. 4B indicate the information unit U and a detector 30 for optical detection, respectively. In FIG. 4A, the pit has a form symmetrical with respect to one of axes AA', BB', CC' and DD'. Therefore, the intensity distribution on the detector 30 is supposed to have a form symmetrical with respect to one of axes aa', bb', cc' and dd' in FIG. 4B. Therefore, the detection of the symmetrical axis i.e. detecting which axis it is symmetrical with respect to, is performed as the first stage of the detection.

Once the symmetrical axis is decided, the direction of the pit is limited in two directions. For example, if the symmetrical axis is the axis cc', the direction of the pit is either upward or downward. It is the second stage of the detection to decide one of those two directions.

Nextly, one example of the method of detecting the pit will be explained, with referring to FIG. 5.

Figure 5:
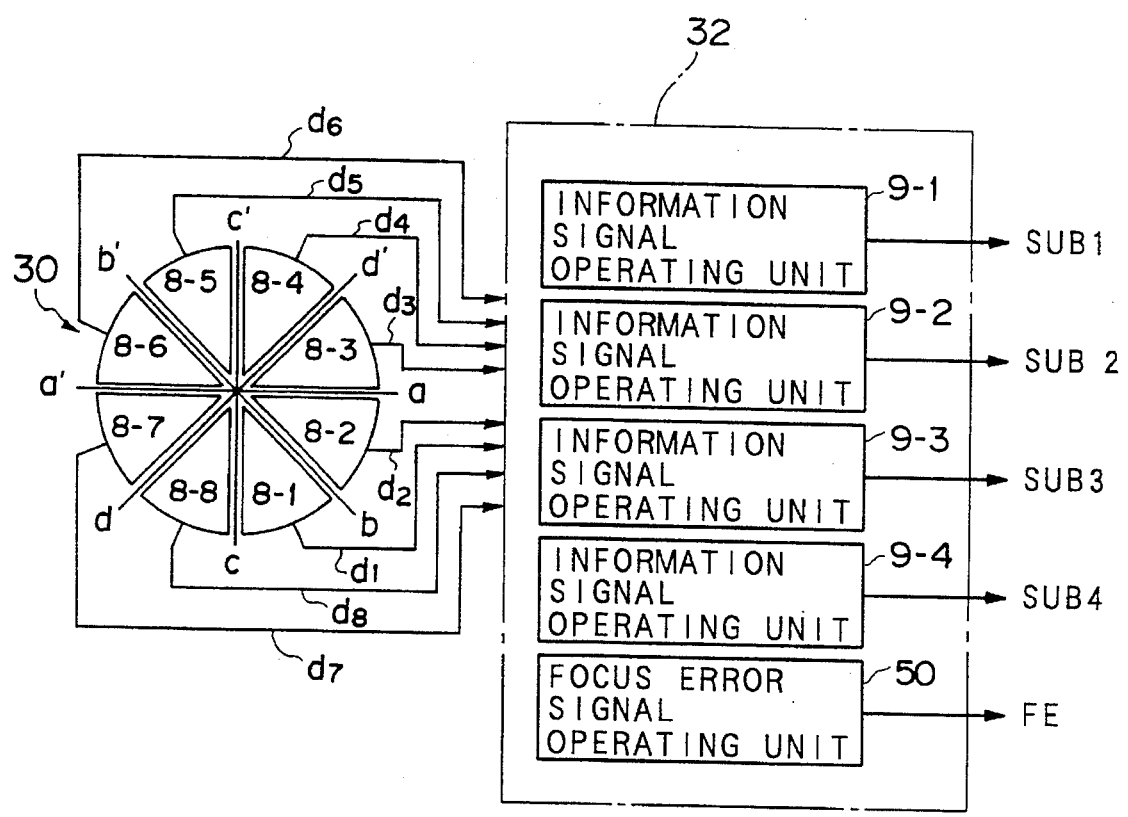
FIG. 5 is a block diagram for showing an eight divided detector and an operating circuit.

FIG. 5 indicates the detector 30, which consists of eight detector pieces 8-1 to 8—8, and an operating circuit 32, which includes four information signal operating units 9-1 to 9-4. Detection signals $d_1$ to $d_8$ of the optical intensity from the eight detector pieces 8-1 to 8—8, are supplied to the operating circuit 32. The information signal operating units 9-1 to 9-4 in the operating circuit 32, carry out the process of the detection signals $d_1$ to $d_8$ according to following expressions (4) to (7), to output difference signals SUB1 to SUB4 respectively. The operating circuit 32 has a focus error signal operating unit 50, which will be mentioned later.

$$SUB1=(d_1+d_2+d_3+d_4)-(d_5+d_6+d_7+d_8) \text{ (right-left)} \ldots \quad (4)$$

$$SUB2=(d_2+d_3+d_4+d_5)-(d_6+d_7+d_8+d_1) \text{ (upper right-lower left)} \ldots (5)$$

$$SUB3=(d_3+d_4+d_5+d_6)-(d_7+d_8+d_1+d_2) \text{ (upper-lower)} \ldots \quad (6)$$

$$SUB4=(d_4+d_5+d_6+d_7)-(d_8+d_1+d_2+d_3) \text{ (upper right-lower left)} \ldots (7)$$

And, the symmetrical axis is detected by finding the minimum value of the signals |SUB1| to |SUB4|. For example, the symmetrical axis will be the axis cc' if the signal |SUB1| is the minimum value.

Nextly, the intensity difference in the direction of the symmetrical axis is taken into consideration. It is enough to compare the intensities of the upper half of the detector $(d_3+d_4+d_5+d_6)$ and the lower half of the detector $(d_7+d_8+d_1+d_2)$, since the symmetrical axis is the axis cc' in the present example. Namely, it is judged whether the pit is in the upward direction or the downward direction by checking the ± sign of the difference signal SUB3. The above explained detecting method is summarized in a following Table 1.

In general, in case of detecting the pits in M (M is even number) kinds of the directions, it is sufficient to perform the same procedure by using an M divided detector.

Nextly, the calculation result is shown.

Figure 6:
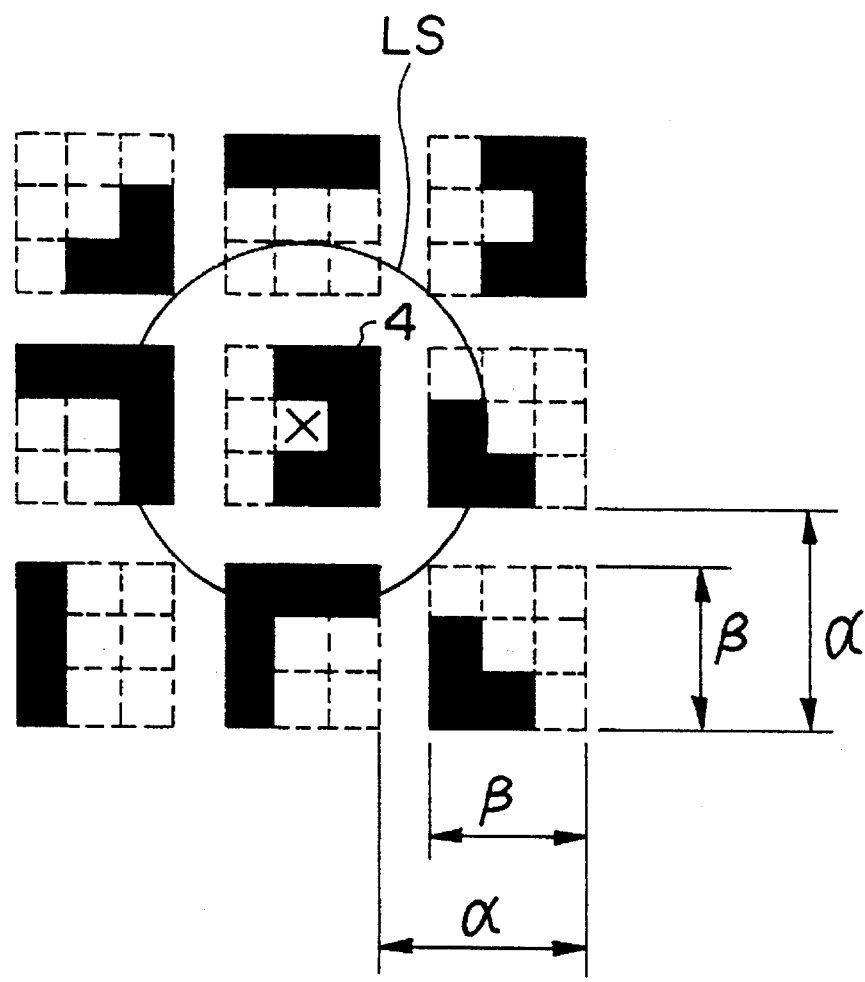
FIG. 6 is a diagram for showing a pit arrangement in which a pit of A1 type is arranged at the center.

The calculation is performed on the basis of a scaler analysis theory. The arrangement of the pits is shown in FIG. 6. A center pit is a pit 4 which is to be read, and pits having various forms are arranged around it. The reference mark LS represents the reading beam.

Unit Interval ($\alpha$): 1.20 μm

Unit Length ($\beta$) : 0.75 μm

Pit Depth : 0.05 μm

Wavelength : 0.78 μm

NA of Objective lens: 0.45

In FIG. 6, the pit 4 of A1 type shown in FIG. 3, is disposed at the center position. The detection signals $d_1$ to $d_8$, a value SUM (i.e. whole light quantity=$\Sigma d_i$) and the difference signals SUB1 to SUB4, are calculated with respect to the case of irradiating the reading beam to each of 16 kinds of pits shown in FIG. 3, disposed at this center position of FIG. 6. The calculated values are shown in FIG. 7. Here, the values in FIG. 7 are values when the incident light quantity is normalized to 1.

By defining the threshold such that it is a small pit if the whole light quantity (SUM) is not less than 0.78 and that it is a large pit if the whole light quantity (SUM) is less than 0.78, the method of detecting the pit becomes as in a following Table 2, according to the aforementioned rule of the present invention.

TABLE 1

| OBTAIN SUB1 TO SUB4 AND THE MINIMUM VALVE FIRST STAGE | → | CHECK ± SIGN SECOND STAGE | → | PIT DIRECTION |
|---|---|---|---|---|
| \|SUB1\| IS THE MINIMUM | | SUB3>0 | | ↑ |
| | | SUB3<0 | | ↓ |
| \|SUB2\| IS THE MINIMUM | | SUB4>0 | | ↖ |
| | | SUB4<0 | | ↘ |
| \|SUB3\| IS THE MINIMUM | | SUB1>0 | | → |
| | | SUB1<0 | | ← |
| \|SUB4\| IS THE MINIMUM | | SUB2>0 | | ↗ |
| | | SUB2<0 | | ↙ |

TABLE 2

```
A1 |SUB3|IS THE MINIMUM → SUB1 > 0 → SUM < 0.78 → RIGHT FACE LARGE PIT
A2 |SUB1|IS THE MINIMUM → SUB3 < 0 → SUM < 0.78 → DOUNWARD LARGE PIT
A3 |SUB3|IS THE MINIMUM → SUB1 < 0 → SUM < 0.78 → LEFT FACE LARGE PIT
A4 |SUB1|IS THE MINIMUM → SUB3 > 0 → SUM < 0.78 → UPWARD LARGE PIT
A5 |SUB4|IS THE MINIMUM → SUB2 > 0 → SUM < 0.78 → RIGHT UPWARD LARGE PIT
A6 |SUB2|IS THE MINIMUM → SUB4 < 0 → SUM < 0.78 → RIGHT DOUNWARD LARGE PIT
A7 |SUB4|IS THE MINIMUM → SUB2 < 0 → SUM < 0.78 → LEFT DOUNWARD LARGE PIT
A8 |SUB2|IS THE MINIMUM → SUB4 > 0 → SUM < 0.78 → LEFT UPWARD LARGE PIT
B1 |SUB3|IS THE MINIMUM → SUB1 > 0 → SUM > 0.78 → RIGHT FACE SMALL PIT
B2 |SUB1|IS THE MINIMUM → SUB3 < 0 → SUM > 0.78 → DOUNWARD SMALL PIT
B3 |SUB3|IS THE MINIMUM → SUB1 < 0 → SUM > 0.78 → LEFT FACE SMALL PIT
B4 |SUB1|IS THE MINIMUM → SUB3 > 0 → SUM > 0.78 → UPWARD SMALL PIT
B5 |SUB4|IS THE MINIMUM → SUB2 > 0 → SUM > 0.78 → RIGHT UPWARD SMALL PIT
B6 |SUB2|IS THE MINIMUM → SUB4 < 0 → SUM > 0.78 → RIGHT DOUNWARD SMALL PIT
B7 |SUB4|IS THE MINIMUM → SUB2 < 0 → SUM > 0.78 → LEFT DOUNWARD SMALL PIT
B8 |SUB2|IS THE MINIMUM → SUB4 > 0 → SUM > 0.78 → LEFT UPWARD SMALL PIT
```

Therefore, the pits of A1 to A8 and B1 to B8 types, can be distinguished from each other.

Figure 8:
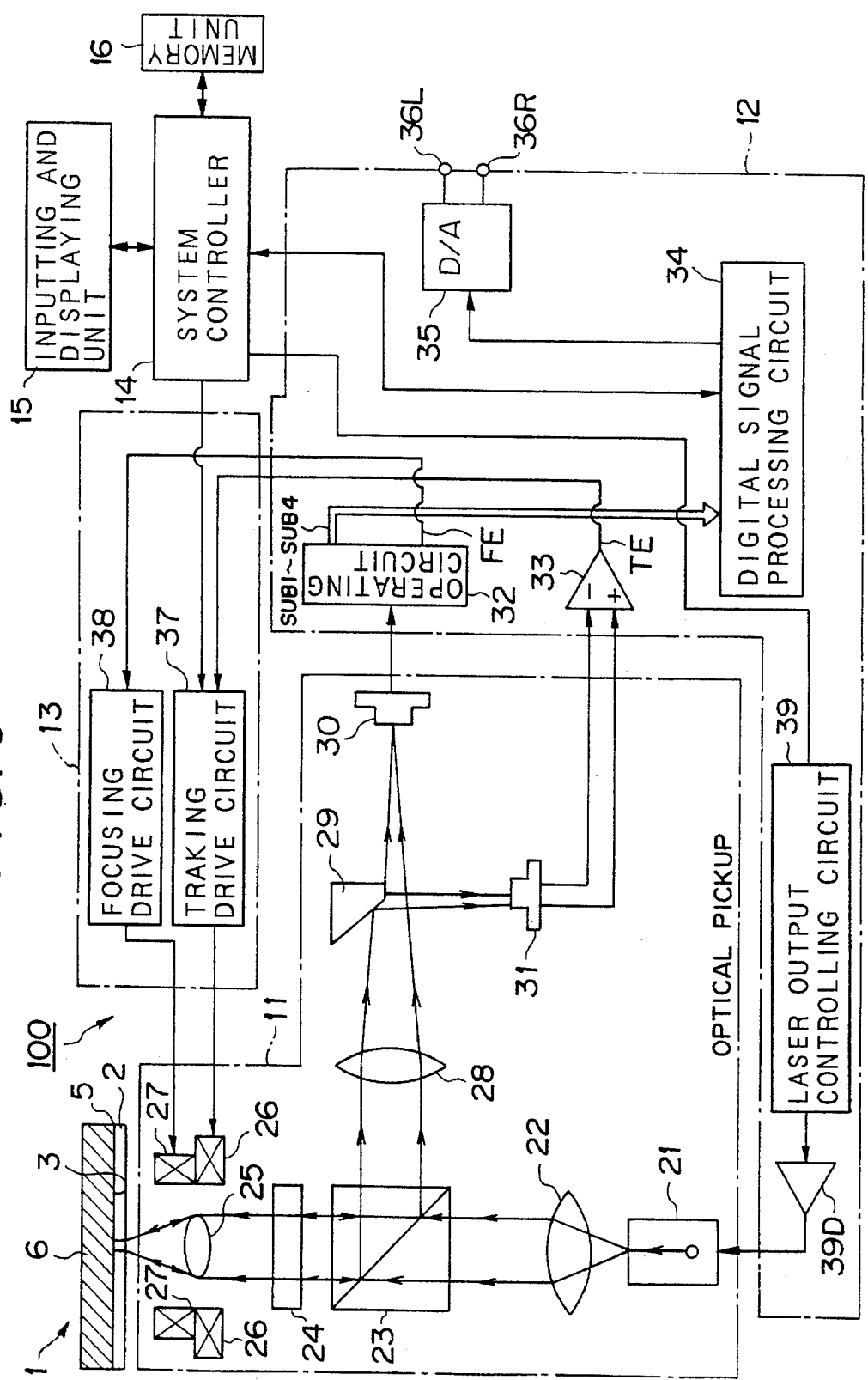
FIG. 8 is a block diagram of a compact disc player of an embodiment of the present invention.
Figure 9:
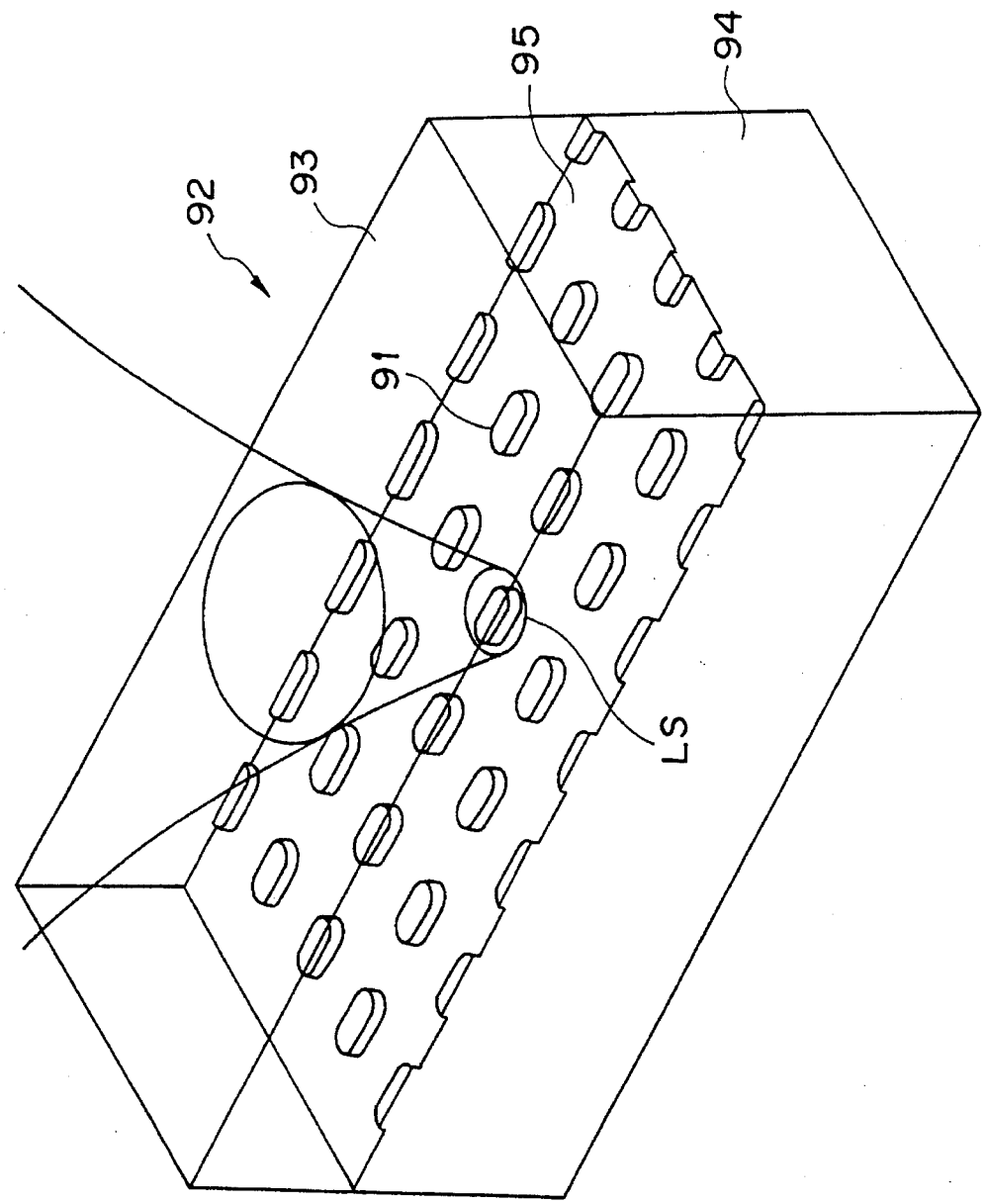
FIG. 9 is a perspective view of an optical disc according to the related art.
Figure 10:
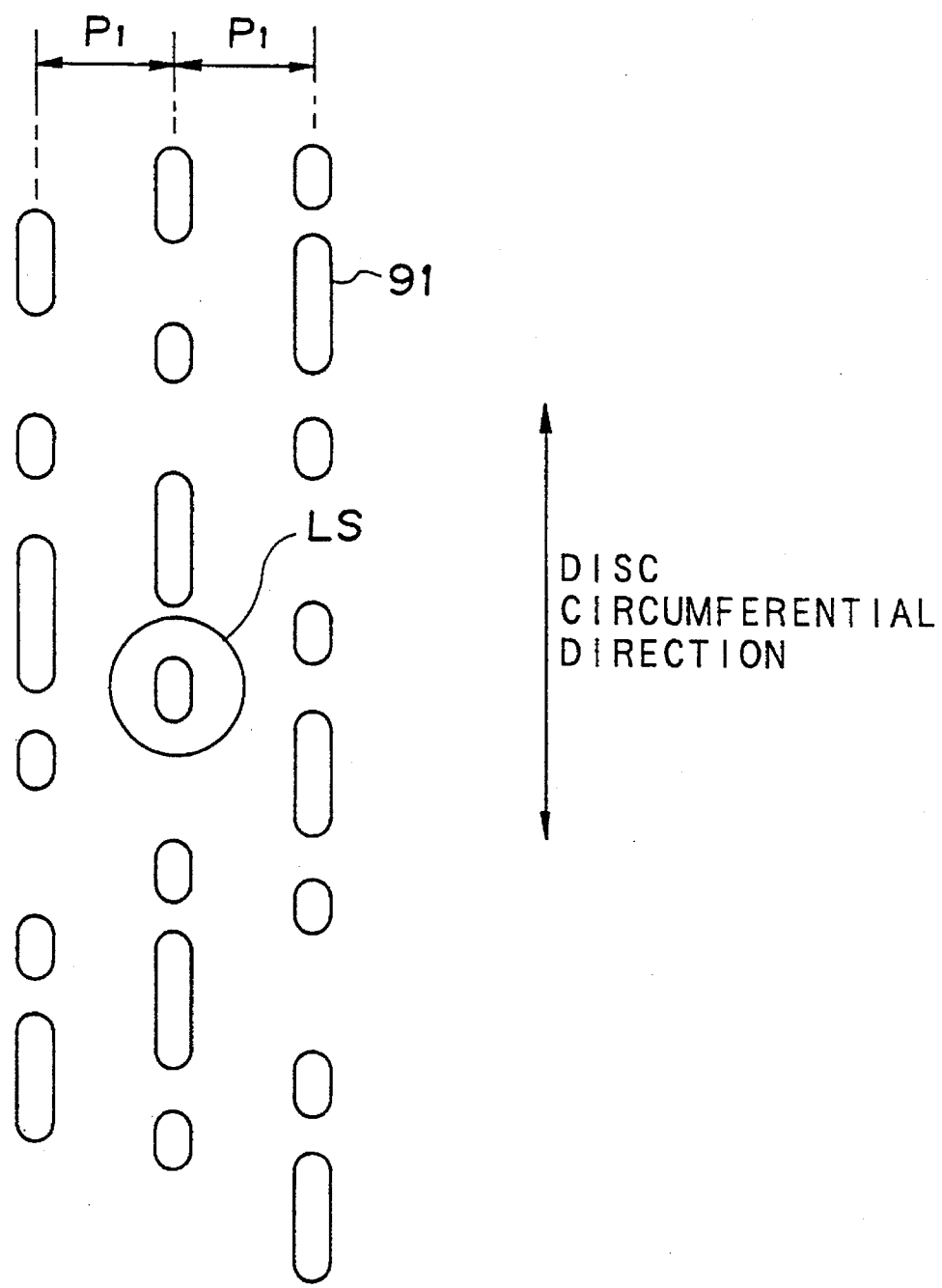
FIG. 10 is a plan view for indicating a track pitch of the optical disc of FIG. 9.
Figure 11:
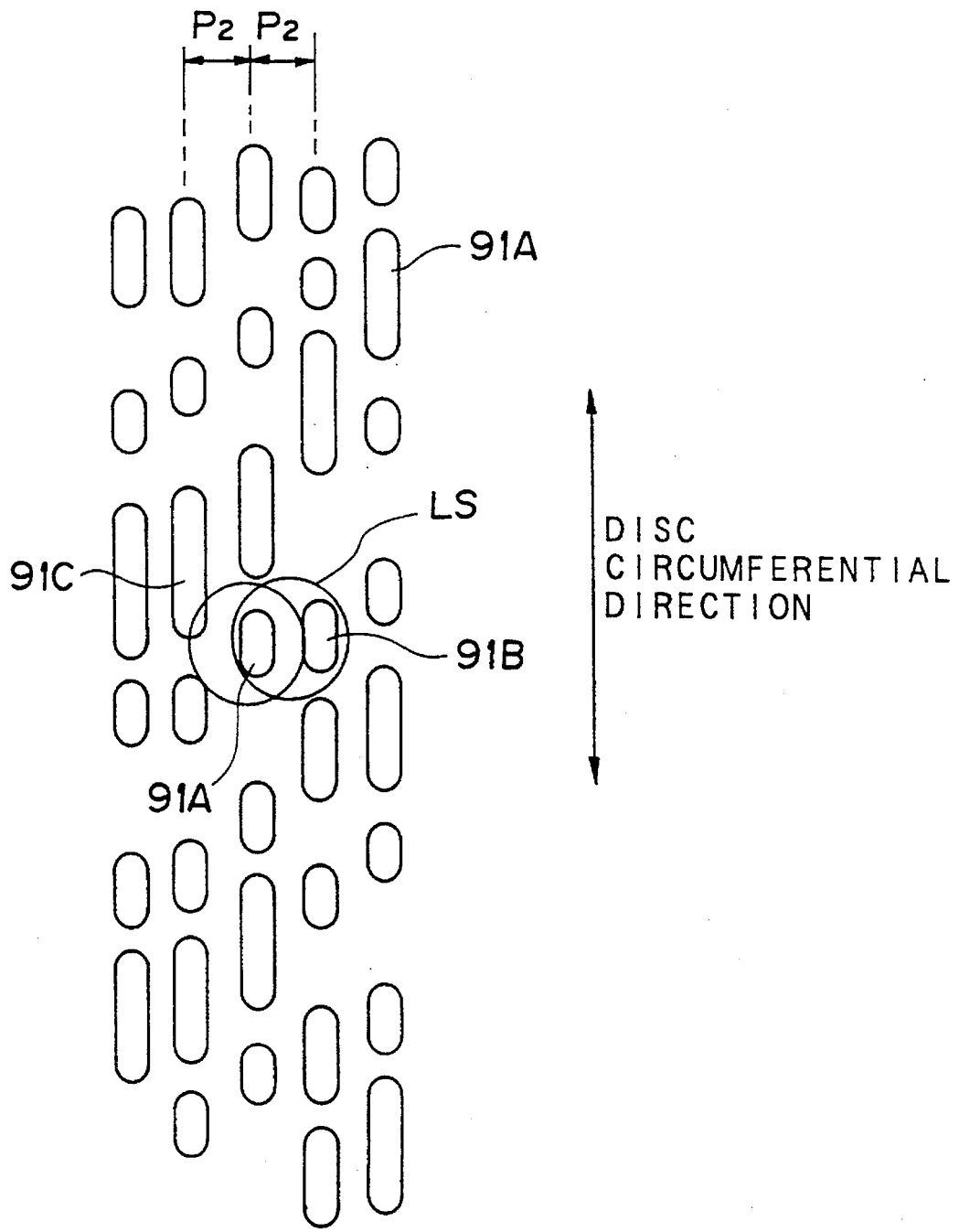
FIG. 11 is a plan view for indicating a case where the track pitch is simply reduced to be ½ of the track pitch of FIG. 11, according to the related art.
Figure 12:
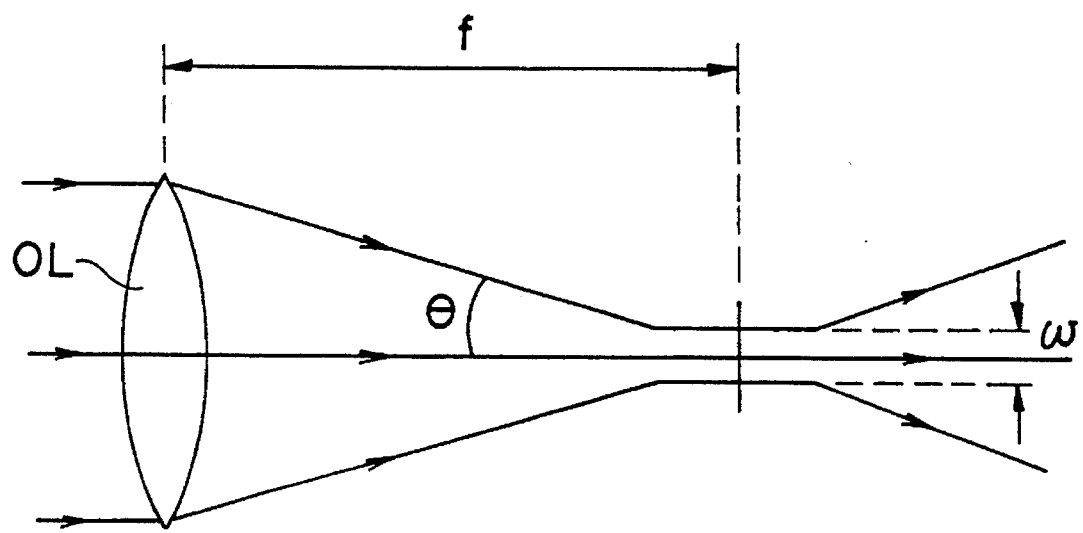
FIG. 12 is a diagram for indicating the relation between an objective lens and a laser spot.

Nextly, FIG. 8 indicates a constitution of a compact disc player, which has the detector 30 and the operating circuit 32 of FIG. 5.

As shown in FIG. 8, a compact disc player 100 is provided with: an optical pickup 11 for reading information from a compact disc (CD) 1; a signal processing unit 12 for processing the read out information signal; a pickup controlling unit 13 for controlling the optical pickup 11; a system controller 14 for carrying out a generalization control of the compact disc player 100 on the whole; an inputting and displaying unit 15 by which various operation commands are inputted and various data are displayed; and a memory unit 16 for storing data necessary for the data process in the system controller 14.

The optical pickup 11 is provided with: a semiconductor laser 21 for generating and irradiating a laser light; a collimator lens 22 for changing the irradiated laser light to a parallel beam; a beam splitter 23 for passing the parallel beam; a ¼ wavelength plate 24 for giving an optical path difference of ¼ wavelength to the parallel beam from the beam splitter 23; an objective lens 25 for condensing the laser light from the ¼ wavelength plate 24 onto the information record surface 3 of the CD 1; a condenser lens 28 for condensing a reflected laser beam, which is reflected by the reflection film 5, passes through the objective lens 25 and the ¼ wavelength plate 24, and which optical path is bent by a right angle at the reflection surface of the beam splitter 23; a prism mirror 29 for directing the reflected laser beam from the condenser lens 28 toward an eight divided photodetector 30; the eight divided photodetector 30 for receiving the reflected laser beam from the prism mirror 29; and a two divided photodetector 31 for receiving the reflected laser beam separated by the prism mirror 29. Here, as shown in FIG. 8, the laser light is irradiated onto the CD 1 from its bottom side.

The signal processing unit 12 is provided with: an operating circuit 32 for receiving the output signals from the eight divided photodetector 30, giving a predetermined operation to the output signals, and outputting the results; a subtracter 33 for receiving the output signals from the two divided photodetector 31, and outputting the difference output as a tracking error signal TE; a digital signal processing circuit 34 for receiving the outputs from the operating circuit 32, applying a digital signal process, and demodulating to output information signals; a D/A converter 35 for converting the digital output from the digital signal processing circuit 34 to an analog signal; and output terminals 36L and 36R for outputting the output from the D/A converter 35 to the external; a semiconductor laser driving circuit 39D for driving the semiconductor laser 21; and a laser output controlling circuit 39 for controlling the semiconductor laser driving circuit 39D.

The pickup controlling unit 13 is provided with: a tracking drive circuit 37 for receiving the tracking error signal TE, which is the output from the subtracter 33, and controlling a tracking actuator 26; and a focusing drive circuit 38 for controlling a focusing actuator 27 on the basis of the focusing error signal FE, which is another output of operating circuit 32.

The system controller 14 controls the digital signal processing circuit 34, the tracking drive circuit 37 and the laser output controlling circuit 39 on the basis of the instructions from the inputting and displaying unit 15, and transmits and receives data to and from the memory unit The more detailed constitutions of the eight divided photodetector 30 and the operating circuit 32 are shown in FIG. 5. As shown in FIG. 5, the eight divided photodetector 30 has the eight light receiving areas i.e. the eight detector pieces 8-1 to 8—8. The operating circuit 32 has the information signal operating units 9-1 to 9-4, and the focus error signal operating unit 50. In this case, the information signals SUB1 to SUB4 are outputted from the information signal operating units 9-1 to 9-4, respectively. The focusing error signal FE is outputted from the focus error signal operating unit 50. Here, the direction of the division line C—C' of the eight divided photodetector 30 is parallel to the circumferential direction of the disc. The optical system is constituted such that the center point of the reflected light spot is coincident with the center point of the eight divided photodetector 30, when the center of the laser spot from the objective lens is irradiated on the center line of the track.

As shown in FIG. 5, the photoelectrically converted light detection signals $d_1$ to $d_8$ are outputted from the respective eight divided light receiving areas i.e. the eight detector pieces 8-1 to 8—8 of the eight divided photodetector 30, and are inputted into the respective information signal operating units 9-1 to 9-4 and the focus error signal operating unit 50. The information signal operating units 9-1 to 9-4 process the respective detection signals $d_1$ to $d_8$ on the basis of the aforementioned expressions (4) to (7), and output the respective difference signals SUB1 to SUB4.

The focus error signal operating unit 50 outputs the focusing error signal FE expressed by a following expression (8).

$$FE = d_1 + d_2 + d_5 + d_6 - (d_3 + d_4 + d_7 + d_8) \ldots \quad (8)$$

If the pits are different in the direction from each other, the pits can be distinguished on the basis of the difference signals SUB1 to SUB4 from the respective information signal operating units 9-1 to 9-4, as aforementioned. However, if the pits are different in both of the direction and the size from each other, it becomes necessary to distinguish the pits on the basis of the difference signals SUB1 to SUB4 from the information signal operating units 9-1 to 9-4, as well as the whole light quantity SUM of the light detection signals $d_1$ to $d_8$, as aforementioned. In this case, the operating circuit 32 of FIG. 8, is constructed to have a function of adding all of the light detection signals $d_1$ to $d_8$ and outputting the whole light quantity SUM.

As described above, according to the present embodiment, one surface deformed portion can hold many pieces of information by changing the direction of the form of the surface deformed portion. And, by changing not only the direction but also the size of the form of the surface deformed portion, one surface deformed portion can hold even more pieces of information. Therefore, high density recording becomes possible without narrowing the track pitch according to the present embodiment.

Moreover, according to the present embodiment, since the surface deformed portion can be distinguished by detecting the direction of the form of the surface deformed portion, the influence of the positional offset of the pattern of the surface deformed portion is little and the construction for detecting the surface deformed portion is rather simple as compared with the case where the pattern recognition of the pattern of the surface deformed portion itself is carried out.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reading an optical disc, said optical disc comprising:

a substrate in a disc shape, having an information record surface on which information is recorded;

a track spirally formed on said information record surface in a circumferential direction of said optical disc, and having a predetermined track pitch in a radial direction of said optical disc;

a plurality of information units arranged in the circumferential direction of the track, each of which has a square shape, and has a predetermined unit length in the circumferential direction and a predetermined unit length in the radial direction; and a plurality of surface deformed portions, each of which is formed in a respective one of said information units and comprises a plurality of surface deformed pieces having substantially the same size, said surface deformed portions having at least M different shapes (M≧2, M: natural number) and being disposed in M different directions on a plane of said information record surface, from a center point of its respective information unit by a combination of said surface deformed pieces, each of said surface deformed portions having a radial contour that is substantially symmetrical with respect to only one straight radial line passing through said center point of its respective information unit and that is asymmetrical with respect to all other straight radial lines passing through said center point, each of said surface deformed portions having a predetermined optical height or depth, wherein all information recorded on said optical disc is in the form of only said plurality of surface deformed portions;

said apparatus comprising:

a light irradiating means for irradiating a laser light having a predetermined wavelength onto said information record surface under an optical condition of a predetermined numerical aperture;

an optical detecting means having M×K divided light receiving surfaces (K: natural number) such that a line parallel to said disc circumferential direction corresponds to one of division lines, for converting light incident on the light receiving surfaces into electric signals to output light detection signals respectively;

an optical system for directing the reflected laser light, which is diffracted and reflected by said surface deformed portions onto a center portion of said light receiving surfaces in case that the laser light is irradiated onto a center line of said track; and an operating means for obtaining an information signal corresponding to the form of the surface deformed portion on the basis of the light detection signals to output the information signal;

wherein said operating means includes means for obtaining the symmetrical axis of the surface deformed portion on the basis of the light detection signals, and means for obtaining the direction of the surface deformed portion on the basis of the light detection signals, said operating means obtaining the information signal on the basis of the obtained symmetrical axis and the obtained direction.

2. An apparatus according to claim 1, wherein:

said surface deformed portions have M×N different shapes (N≧2, N: natural number), in M different directions and N different sizes on the plane of said information record surface, by predetermined combinations of said surface deformed pieces; and said operating means further includes means for obtaining the size of the surface deformed portion on the basis of the light detecting signals.

3. An apparatus according to claim 1, wherein said operating means includes means for obtaining a focusing error signal on the basis of the light detection signals.

4. A method of recording and reproducing an optical disc, comprising the steps of:

preparing a substrate in a disc shape, having an information record surface on which information is to be recorded;

forming a track spirally on said information record surface in a circumferential direction of said optical disc, said track having a predetermined track pitch in a radial direction of said optical disc;

arranging a plurality of information units in the circumferential direction on the track, each of which has a square shape;, and has a predetermined unit length in the circumferential direction and a predetermined unit length in the radial direction;

converting and recording the information into a form of a surface deformed portion, by forming a plurality of surface deformed portions, each of which is formed in a respective one of said information units and comprises a plurality of surface deformed pieces having substantially the same size, and by giving at least M kinds of forms to said surface deformed portions (M≧2, M: natural number) and being disposed in M different directions on a plane of said information record surface, from a center point of its respective information unit by a combination of said surface deformed pieces, each of said surface deformed portions having a radial contour that is substantially symmetrical with respect to only one straight radial line passing through said center point of its respective information unit and that is asymmetrical with respect to all other straight radial lines passing through said center point, each of said surface deformed portions having a predetermined optical height or depth;

wherein all information recorded on said optical disc is in the form of only said plurality of surface deformed portions;

irradiating a laser light having a predetermined wavelength onto said information record surface under an optical condition of a predetermined numerical aperture;

directing the reflected laser light, which is diffracted and reflected by said surface deformed portions, onto a center portion of M×K divided light receiving surfaces (K: natural number) of an optical detecting means in which a line parallel to said disc circumferential direction corresponds to one of division lines, in case that the laser light is irradiated onto a center line of said track;

converting light incident on the light receiving surfaces onto electric signals to output light detection signals respectively, by said optical detecting means; and obtaining an information signal corresponding to the information converted into the form of the surface deformed portion on the basis of the light detection signals;

wherein, in the information signal obtaining step, the symmetrical axis of the surface deformed portion and the direction of the surface deformed portion are firstly obtained on the basis of the light detection signals, to obtain the information signal on the basis of the obtained symmetrical axis and the obtained direction.

5. A method according to claim 4, wherein:

in the information converting and recording step, M×N different shapes (N≧2, N: natural number) are given to said surface deformed portions, said surface deformed portions being formed in N different sizes and in M different directions from the center point of their respective information units on the plane of said information record surface, by predetermined combinations of said surface deformed pieces; and in the information signal obtaining step, the size of the surface deformed portion is obtained on the basis of the light detection signals.

6. A method according to claim 4, further comprising the steps of:

obtaining a focusing error signal on the basis of the light detection signals; and performing a focus tracking control of said optical disc on the basis of the focusing error signal while detecting the reflected laser light.

* * * * *